United States Patent [19]

Alpers

[11] 4,350,982

[45] Sep. 21, 1982

[54] FREQUENCY-AGILE TRANSPONDER

[75] Inventor: Frederick C. Alpers, Ridgecrest, Calif.

[73] Assignee: The United States of America as represented by the Secretary of the Navy, Washington, D.C.

[21] Appl. No.: 476,164

[22] Filed: Jun. 3, 1974

[51] Int. Cl.³ .......................................... G01S 13/80
[52] U.S. Cl. ......................... 343/6.8 R; 343/17.2 PC; 343/18 E
[58] Field of Search ................... 343/6.8 R, 17.2 PC, 343/18 E

[56] References Cited

U.S. PATENT DOCUMENTS

| | | | |
|---|---|---|---|
| 2,929,925 | 3/1960 | O'Day et al. | 343/6.8 R |
| 3,007,156 | 10/1961 | Barber | 343/6.8 LC |
| 3,018,475 | 1/1962 | Kleist et al. | 343/6.8 R |
| 3,048,835 | 8/1962 | Perkins | 343/6.8 R |
| 3,225,349 | 12/1965 | Thor | 343/17.2 PC X |
| 3,866,225 | 2/1975 | Buck | 343/18 E |

*Primary Examiner*—T. H. Tubbesing

[57] ABSTRACT

A compact transponder for use with frequency-agile pulsed radars incorporating an Amplified Ferromagnetic Echo Device (AFED) which repeats, backwards, after a short and controllable delay, a microwave pulse fed into it.

6 Claims, 8 Drawing Figures

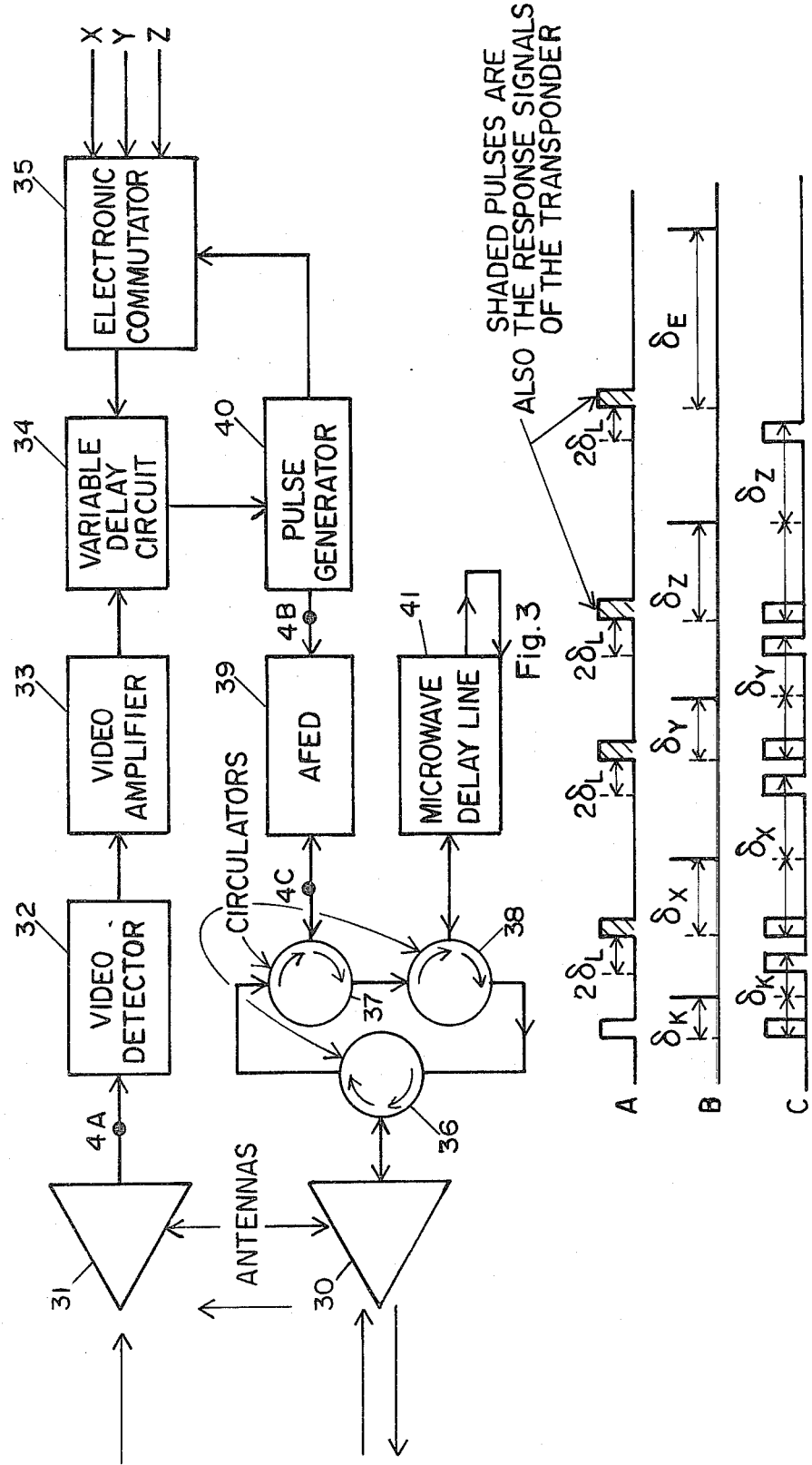

FREQUENCY-AGILE TRANSPONDER

BACKGROUND OF THE INVENTION

Since World War II, radar transponders have been used for various military and civilian purposes such as facilitating the radar tracking of aircraft at long ranges. Most transponder designs have provided for receiving radar pulses only at a preset or mechanically tuned radar frequency, and nearly all have responded at a fixed, prearranged frequency, which has generally been different from the frequency of the received pulse, although it might have been the same as the received pulse if a sufficient delay in responding were provided.

With the introduction of radars having frequency agility, transponders have been designed that utilize broadband microwave amplifiers and microwave delay lines and therefore return a signal at the same frequency as that received, but at a later time. However, to avoid undesirable oscillations due to coupling of the transponder output signal back to the input before a given pulse is completed, a microwave delay line with a delay of one pulse width or greater is needed and this is generally a large unwieldy component.

SUMMARY OF THE INVENTION

The invention provides a compact transponder which incorporates a microwave component known as an Amplified Ferromagnetic Echo Device (AFED), suitable for use with frequency-agile pulse radars. Even though a radar may change frequency randomly on a pulse-by-pulse basis, the present transponder provides a response signal at the precise frequency of any given transmitter pulse that triggers it. Transponders of this type may be useful in helping a surface radar to identify and track an associated defense missile, in helping an airborne radar to tie in with ground coordinates, etc. The transponder of the invention is also readily adapted to returning a signal in the particular direction from which it was received and when pulse compression is used, the transponder provides a return signal tht can be automatically distinguished from normal echo signals.

BRIEF DESCRIPTION OF THE DRAWINGS

FIG. 3 is a block diagram of a frequency-agile transponder with encoded-data response;

FIG. 4 shows the RF envelope waveforms associated with the block diagram of FIG. 3;

DESCRIPTION OF THE PREFERRED EMBODIMENTS

The invention centers on the use of a microwave component known as an Amplified Ferromagnetic Echo Device (AFED). The component is described in various publications among which is "Role of Mode Interaction in the Amplification and Suppression of Echoes" by G. F. Herrmann, D. E. Kaplan and R. M. Hill, *The Physical Review,* Volume 181, Number 2, pages 829-841, dated May 10, 1969 and "Amplified Ferrimagnetic Echoes" by D. E. Kaplan, R. M. Hill and G. F. Herrmann, *Journal of Applied Physics,* Volume 40, Number 3, pages 1164-1171, Mar. 1, 1969. The AFED is an yttrium iron garnet (YIG) crystal in a magnetic field with suitable electromagnetic and power pulse couplings to the crystal. The device has the peculiar capability of repeating backwards, after a short and controllable delay, a microwave pulse that is coupled into it. Furthermore, the repeated pulse is an amplified form of the input with frequency and phase relationships within the pulse retained precisely.

Thus, if essentially a constant-frequency rectangular pulse, as transmitted by magnetron-type radar transmitters, is fed into the AFED, an amplified pulse at the same microwave frequency and pulse width is given out after a short delay; and if a frequency-swept or "chirped" radar pulse is fed in, a "mirror image" or reversely swept microwave pulse is similarly outputted.

Both the power for the amplification and the control for the delay are provided by a very narrow (approximately ten nanosecond) power or "recall" pulse that is applied within several microseconds of the start of the input pulse. The position of the repeat pulse on the time axis is symmetrical with the input pulse about the recall pulse position; that is, the repeat pulse occurs at a time such that the interval between the recall pulse and the trailing edge of the repeat pulse equals the interval between the leading edge of the input pulse and the recall pulse.

An increase or decrease in the delay of the recall pulse with respect to the input pulse therefore results in an increase or decrease of twice that amount in the delay of the output pulse with respect to the input pulse.

AFED's can be supplied at most, if not all, microwave frequencies and have bandwidths as great as twenty percent. They can work with inputs as low as $5 \times 10^{-12}$ w peak and provide 40 db or more of dynamic range and amplifications as great as 50 db. Volumes required may be as little as 1 cubic inch and weights, including magnets, as low as 6 ounces.

Figure 1:
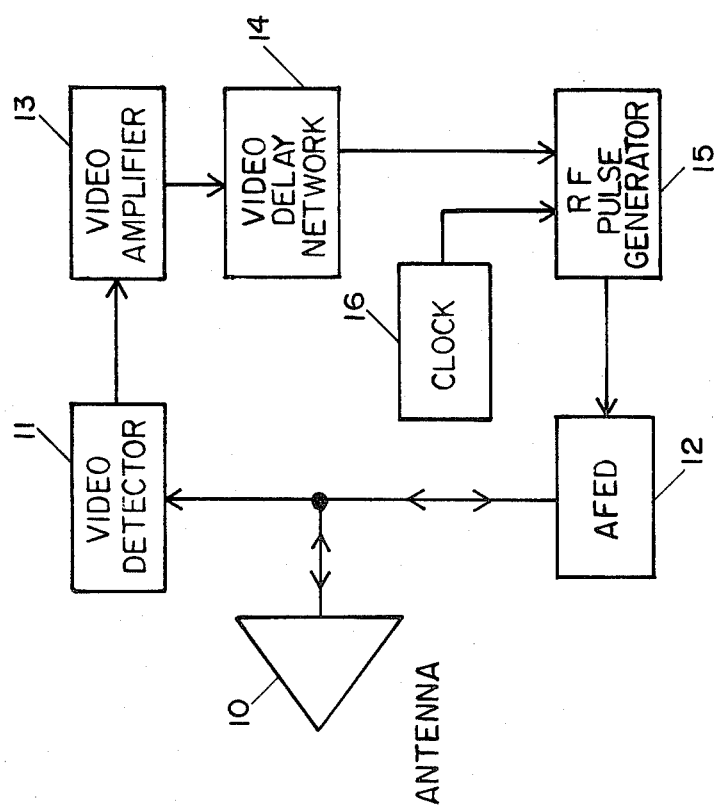
FIG. 1 is a block diagram of the basic embodiment of a frequency-agile transponder.

A basic form of a frequency-agile transponder is set forth in FIG. 1. A microwave signal from an interrogating radar is received by the antenna 10, from which it is coupled to both a video detector 11 and AFED 12. The video pulse from the detector 11 is amplified in a video amplifier 13 and coupled to a small video delay network 14 where it is delayed by a small amount, generally an interval only slightly greater than the radar pulse width, which is typically less than or equal to two microseconds. The output of the delay network 14 is coupled as one input to an RF pulse generator 15. Another input to the RF pulse generator is outputted from an electronic clock 16. The output of the pulse generator 15 is coupled back to the AFED 12.

In operation, the output of the delay network is used to trigger the recall pulse (approximately ten nanoseconds) from RF pulse generator 15. The electronic clock 16 is used to activate the pulse generator 15 only during particular time periods when a transponder response is desired. If no recall pulse is generated and applied to the AFED 12 within a few microseconds of the arrival of the input pulse from the radar coupled into the antenna 10, the AFED absorbs the energy of the incoming signal and no further action takes place.

If a recall pulse is generated, however, an amplified, backward replica of the input pulse is supplied by the AFED to the antenna 10 and this repeat pulse is radiated as a response pulse from the transponder. As long as the input pulse is within the broad bandwidth of the AFED, a response pulse occurs which is at the same frequency as the radar transmitted pulse received at antenna 10 and therefore is suitable for reception by the normal echo receiving circuits of the radar regardless of radar pulse-to-pulse frequency agility. The delay between the input pulse and the recall pulse is essentially fixed, and therefore the overall delay in response of the transponder is also essentially constant and can be measured and taken into account in any range measuring or timing operations in which the transponder is used.

The basic transponder of FIG. 1 has several shortcomings when applied to situations where power levels are critical. In the arrangement shown in FIG. 1, the input signal is split between the detector 11 and the AFED 12, which reduces the signal available to each by 3 db. Where space is available, use of a separate antenna for each of the video detectors and AFEDs would avoid this loss. However, the transponder will still require an input signal of appreciable strength (approximately $10^{-9}$ w) because of the relatively poor sensitivity of the video detector 11.

To overcome this limitation and thereby take advantage of the high sensitivity of the AFED, a low-noise microwave amplifier may be inserted just ahead of the detector.

Figure 2:
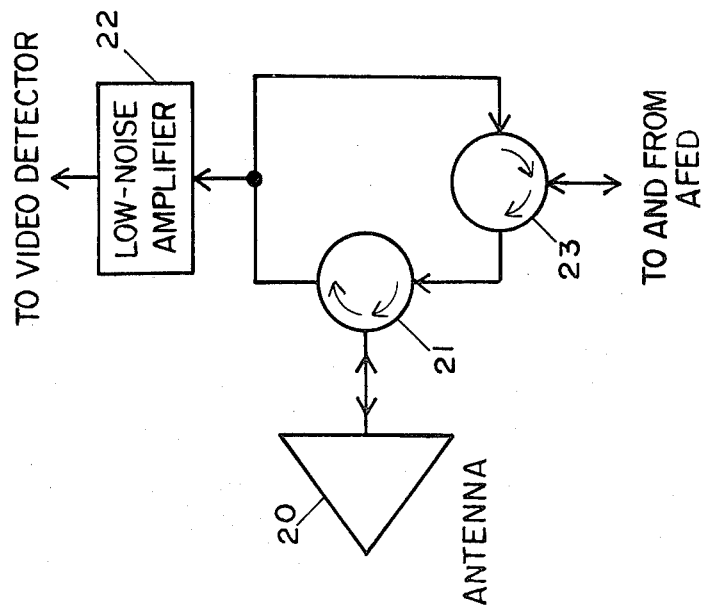
FIG. 2 is an alternate input for the arrangement of FIG. 1.

The arrangement shown in FIG. 1 also results in a 3 db loss in the response signal from the AFED 12 due to a split in the AFED output between the antenna 10 and the detector 11. Again, use of separate antennas for the AFED input/output can avoid this loss, but alternatively the arrangement shown in FIG. 2 accomplishes the same purpose. In FIG. 2, the interrogating radar signal is received on antenna 20 and coupled through circulator 21 to a low-noise amplifier 22 and thence to a video detector. The circulator 21 is also coupled to a circulator 23 the output of which is coupled to the AFED. In this arrangement, the two microwave circulators 21 and 23 direct the AFED output to the antenna only. A further delayed output signal resulting from the AFED feeding around through the detector loop to cause an unwanted second triggering of the pulse generator might arise. However, this can be avoided by providing a suitably long time constant in the associated pulse generator recovery network.

FIG. 3 illustrates a frequency-agile transponder with encoded-data response. This is a more complex but for some purposes a more useful frequency-agile transponder circuit. In this arrangement, an interrogating radar pulse is received on antennas 31 and 30. The output of antenna 31 is coupled through a detector 32 to a video amplifier 33, the output of which is coupled as an input to a variable delay circuit 34. The variable delay circuit also receives the output of an electronic commutator 35 which has inputs thereto corresponding to various delay control voltages X, Y and Z.

The output of antenna 30 is coupled to a network of circulators 36, 37 and 38. Circulator 37 is coupled to an AFED 39 which receives an input from a pulse generator 40. Pulse generator 40 receives an input from the variable delay circuit 34 and outputs a pulse to the electronic commutator 35 as well as the AFED 39. Circulator 38 is coupled to a microwave delay line 41.

In the system of FIG. 3, an incoming signal from an interrogating radar enters both antennas 31 and 30. The signal received on antenna 31 is coupled through detector 32 and video amplifier 33 and then triggers the variable delay circuit 34. After a controlled delay that may be varied from a fraction of a microsecond to approximately four microseconds, an output from the delay circuit 34 triggers the recall pulse generator 40. The delay circuit is conventional and may be a delay multivibrator, multiar, or other such circuit in which the delay is controlled by a DC voltage.

At the same time, the signal received on antenna 30 passes through the microwave circulators 36 and 37, (direction of the passage is indicated by arrows) and is coupled to the AFED 39. When the recall pulse is generated, the direction of signal flow in the AFED 39 is reversed and, following a symmetrical delay as described previously, an amplified and reversed microwave output pulse issues forth from the AFED. The network of circulators routes this pulse to a microwave delay line 41 which typically has a delay slightly in excess of half of one pulse width. In the delay line 41 the pulse travels the length of the line, reflects backward from a short-circuit termination, travels the length of the line in the reverse direction and is then routed by the circulators to the lower antenna 30.

Thus, a delayed response pulse is provided in much the same manner as with the transponder of FIG. 1, but the action of the circuit of FIG. 3 is not yet complete. Linkage of a small portion of the initial response pulse around through the circulators back to the AFED input (or intentional coupling of a small portion back to the AFED through an attenuator, not shown, provided for this purpose) results in a second input pulse to the AFED 39 and an external coupling of the response signal from the antenna 30 to the antenna 31 results in a second triggering of the recall pulse generator 40. In this case, the recovery network time constant of the pulse generator is very short. Requisite signals are therefore present to give rise to a second output pulse from the AFED 39, and this, after a two-way passage through the delay line, results in a second response pulse from the transponder. Recycling of this second response pulse in turn gives rise to a third, etc., so that a whole series of response pulses may be emitted.

If the control voltage applied to the variable delay circuit 34 is constant, all of the above series of response pulses will be equally spaced. However, use of uneven spacing affords the opportunity to convey identification or other information from the transponder to the interrogating radar in pulse delay modulation (PDM) format. This modulation is introduced by the electronic commutator 35 and a feedback from the pulse generator 40. When the input pulse from the radar is received, the control voltage supplied to the delay circuit 34 via the commutator 35 is a voltage that results in minimum delay (i.e., just slightly more than one pulse width). With the first triggering of the pulse generator 40, the feedback from the pulse generator 40 to the electronic commutator 35 causes the commutator to advance one step and a voltage X is substituted at the delay circuit control point. This leads to a delay of $\delta_x$ for the next signal processed through the detector channel, which is the signal used for timing the second response pulse of the transponder. A second feedback signal from the pulse generator 37 then advances the commutator 35 a second step and causes a voltage Y to be fed to the delay control point, which in turn results in a delay of 67 $_y$, etc. Thus, the interpulse spacing is varied according to a set of voltages that may be either preset or supplied by related sensors or other data sources.

The information may be in analog form (i.e., with X, Y, etc. free to take on any voltage within established limits) or in digital form (as when only two voltage values are permitted and the particular sequence of two-valued delays that results constitutes a digital word).

After the final recall pulse in a given response series, the commutator is advanced to a position that applies a voltage resulting in a maximum delay, and, because the recycling of the final response pulse through the detector channel then results in a pulse generator output that is delayed too long to be accepted as a recall pulse by the AFED 39, no AFED output results and the recycling ceases. This is so because the recall pulse must be supplied within a few microseconds (definitely less than five microseconds) whereas the delay circuit maximum is nearly ten microseconds. However, the belated output of the pulse generator 40 to the commutator 35 does serve to advance the commutator back to its original position so that it is ready for the input pulse in the next interrogating radar cycle.

Attention is now directed to the RF envelope waveforms of FIG. 4 which are taken at various points in the block diagram of FIG. 3. It is to be noted that waveform C of FIG. 4 illustrates the input as well as the output of the AFED. The input pulse from the interrogating results in an output of the pulse generator 40 after a delay of $\delta_k$, which is the minimum delay mentioned above. In this description, the delays in triggering the pulse generator are primarily delays introduced by the variable delay circuit, but include small inherent delays associated with the detector 32 and video amplifier 33. The output from the AFED 39 then occurs with the aforementioned symmetrical timing which results in the trailing edge of the output pulse following the recall pulse by $\delta_k$. The two-way passage through the microwave delay line 41 introduces an additional delay of $2\delta_L$ following the leading edge of the AFED output before the initial response pulse is reradiated toward the interrogating radar. The total delay between the input pulse from the radar and the initial response pulse of the transponder is therefore $(2\delta_k + 2\delta_L - \delta_p)$, where $\delta_p$ is the pulse width. Similarly, the delays between succeeding response pulses are $(2\delta_x + 2\delta_L - \delta_p)$, $(2\delta_y + 2\delta_L - \delta_p)$, etc., and since $\delta_L$ and $\delta_p$ are known and constant, $\delta_x$, $\delta_y$, etc., can readily be determined by measuring interpulse intervals of the response pulses received at the interrogating radar. As indicated above, the relatively long delay $\delta_E$ elicits no output from the AFED 39 and causes a cessation of the response series.

An AFED characteristic that is not apparent from the FIG. 4 waveforms is that the amplitude of the output pulse from the AFED has an inverse relationship with the amount of delay introduced. This might cause the various pulses in the transponder response series to vary considerably in amplitude as well as in timing. However, if the attenuation in the leakage path from delay line output to AFED input is not large and if the power provided in the recall pulse is adequate (since the AFED output also varies with recall pulse power almost directly), the response pulses following the initial pulse will tend towards saturation and unwanted amplitude modulation will be eliminated.

Figure 5:
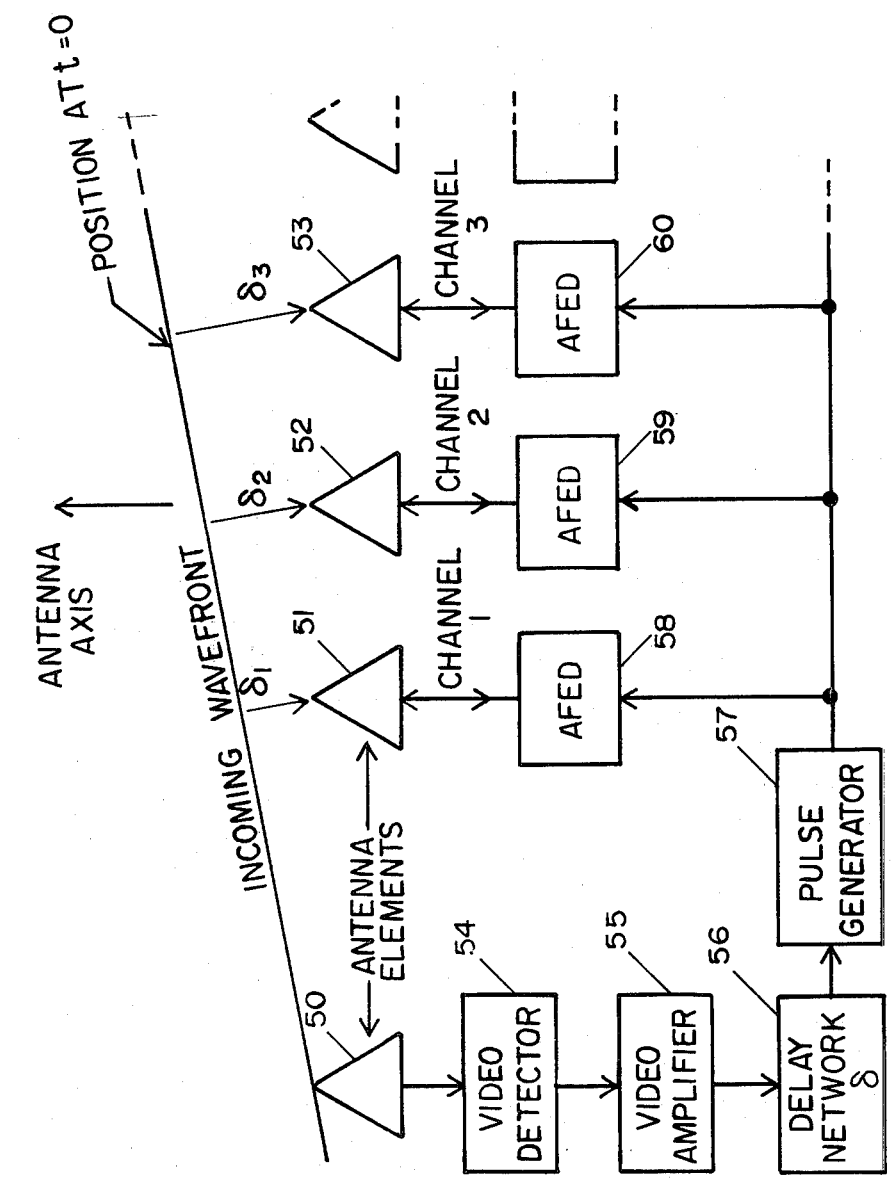
FIG. 5 is a frequency-agile transponder with counter-directional response.

A frequency-agile transponder arrangement that is particularly suited to operation over long ranges (e.g., perhaps at a space station) is shown in block diagram form in FIG. 5. In FIG. 5, an incoming signal or wavefront is received at antenna elements 50, 51, 52, 53, etc. The signal received at antenna 50 is coupled again to a video detector 54, the output of which is coupled through a video amplifier 55 to the input of a delay network 56. The delay output of the delay network 56 is coupled as an input to a pulse generator 57, the output of which is coupled to the AFEDs 58, 59, 60, etc. which are associated with the respective antennas 51 through 53.

In the embodiment of FIG. 5, a multi-element antenna is used and the AFEDs are operated essentially in parallel so that the total power involved in the response is greatly increased. However, a more unique feature of the arrangement is that the response pulse can be highly directive and is propagated in a direction exactly opposite to the direction of the incoming interrogating radar pulse even though this direction may be offset from the antenna axis. Thus, the response is automatically redirected toward the interrogating radar without requiring a special mechanical or electronic alignment of the antenna in that particular direction. This directivity further increases the capability for long range operation, and, in addition, it provides a degree of security or privacy in that the response is aimed only at the actual interrogator. Since mechanical aiming of the antenna is not required, the transponder can respond to interrogations from a number of different directions in a random and intermixed manner.

In FIG. 5, the incoming signal is received from the interrogating radar on antenna element 50 and directed through the video detector 54, video amplifier 55 and delay network 56 to the pulse generator 57. It is also received through a number of additional antenna elements 51 through 53, which are connected to AFEDs 58, 59 and 60 respectively. The number of antenna elements and AFEDs depends on the individual requirements of a specific situation. Also, the antenna elements connected to the AFEDs can be arranged in either a linear array (as shown) or a planar (two dimensional) array. In each of the AFED channels (which are all identical) the signal is coupled into the AFED, which behaves in the manner previously described. The signal received on antenna 50 is detected, amplified, delayed and used to trigger the recall pulse generator 57, just as in the previously described embodiments. Again, it is to be understood that a low-noise microwave amplifier may be utilized, if desired, ahead of the detector 54.

Figure 6:
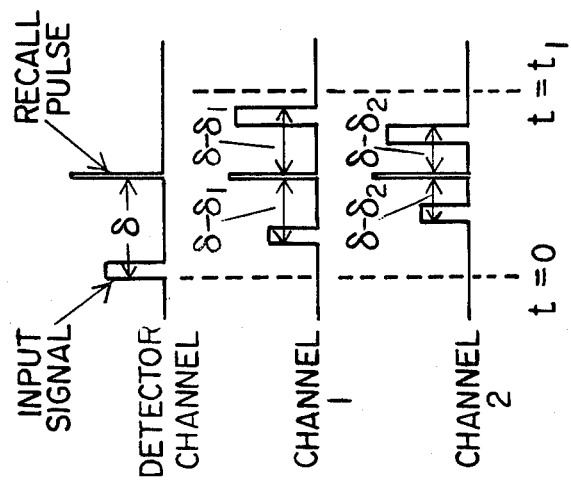
FIG. 6 illustrates waveforms at various points in FIG. 5.

In the embodiment of FIG. 5, the output of the recall pulse generator 57 is connected to all of the AFEDs in parallel, with care being taken to assure that the recall leads to all AFEDs are of the same electrical length. The resulting action is then that which is depicted by the RF envelope waveforms of FIG. 6, where the differences between adjacent channels have been greatly exaggerated for explanatory purposes.

If the incoming signal from the interrogating radar is thought of as being received at antenna 50 and being coupled to the detector channel at time zero, the recall pulse will be generated at time $\delta$, where again the delay $\delta$ includes inherent delays in the detector 54 and amplifier 55 as well as the delay intentionally introduced by the delay network 56. The signal received at antenna 51 arrives after a very short delay $\delta_1$ that is caused by the time taken for the signal to travel an additional distance to reach the antenna 51 with respect to antenna 50. (For a signal incoming from a position to the left of the antenna axis as depicted in FIG. 5, $\delta_1$ is positive, while for a signal arriving from the right the same considerations apply if $\delta_1$ is negative.) Similarly, the signal arrives at antennas 52, 53, etc., after delays of $\delta_2$, $\delta_3$, etc. The time of arrival of the leading edge of the signal at antenna 51 is therefore $\delta\text{-}\delta_1$ ahead of the arrival of the recall pulse from the pulse generator 57, while that at antenna 52 is $\delta\text{-}\delta_2$ ahead of the recall pulse, etc. The symmetrical timing characteristic of the AFED then results in output signals in the respective antennas for which the trailing edges occur at $\delta\text{-}\delta_1$, $\delta\text{-}\delta_2$, etc. respectively following the recall pulse.

If the timing of the AFED outputs is now referenced to a time $t_1$, that occurs at a delay $\delta\text{-}\delta_p$ following the recall pulse, where $\delta_p$ is the signal pulse width (identical in all channels), the leading edge of the output signal at antenna 51 occurs at time $(\delta\text{-}\delta_1\text{-}\delta_p)\text{-}(\delta\text{-}\delta_p) = -\delta_1$, while that at antenna 52 occurs at a time $-\delta_2$, etc. This means that at time $t_1$ the output signal from antenna 51 will have been propagated through the associated antenna element and traveled a distance equal to $\delta_1$, while that from antenna 52 will have traveled a distance of $\delta_2$, etc. Recalling that the AFEDs repeat their signals with frequency and phase relationships precisely retained then leads to the conclusion that the overall response signal resulting from the antenna arrays will be a wavefront which at $t_1$ is in the same position as the incoming signal was at $t_0$, but is advancing in the opposite direction. Thus, the result is a counterdirectional response.

The circuits of FIGS. 1, 3 and 5 provide response pulses that are essentially amplified replicas of the incoming radar signals whenever the signals are rectangular, constant-frequency, (sin x)/x pulses as are generally associated with magnetron transmitters. However, signals from chirped radars are repeated with the frequency swept in the reverse direction. The normal pulse-compression-type radar receiving circuits will expand rather than compress such backward pulses, and hence will render them undetectable. For satisfactory detection of such pulses without degrading the capability of the radar against true echo pulses, the circuit of FIG. 7 can be incorporated in the radar.

Figure 7:
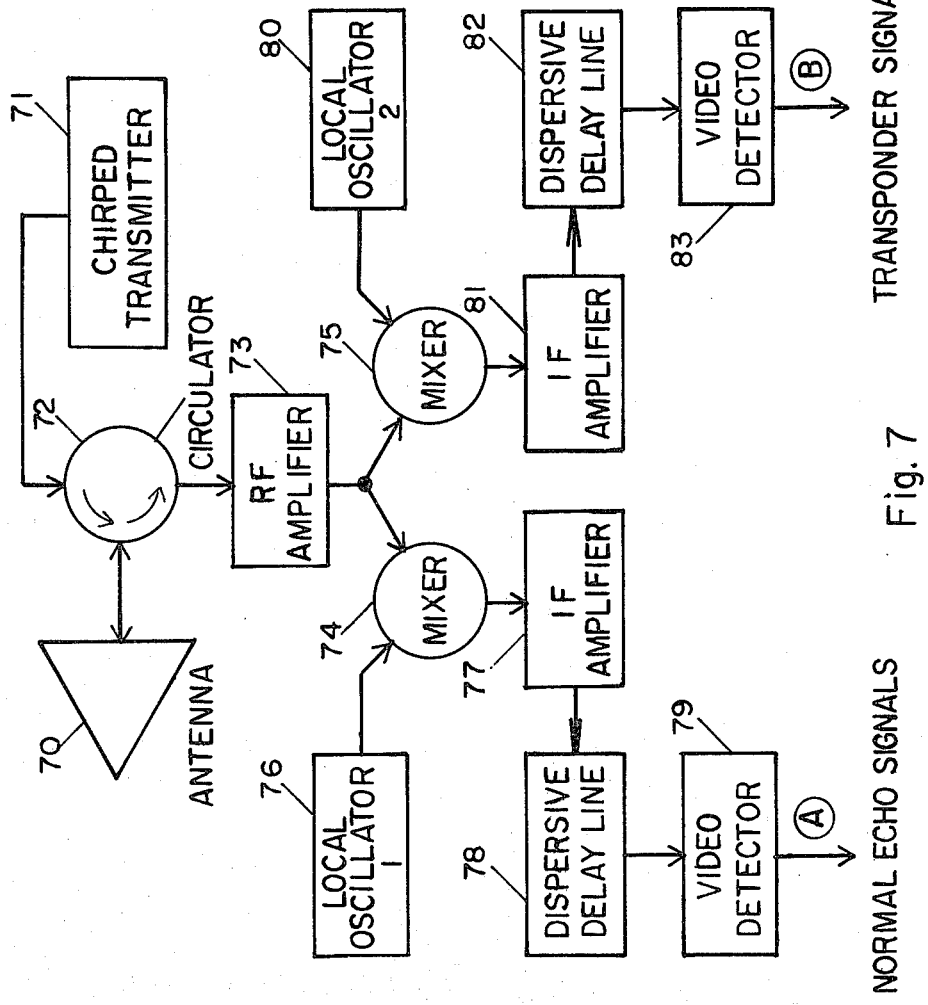
FIG. 7 is a block diagram of a circuit for separating frequency-agile transponder signals from normal echo signals in a chirped radar.

FIG. 7 illustrates a circuit for separating frequency-agile transponder signal received from a transponder from normal echo signals in a chirped radar system. Antenna 70 is adapted to receive signals from a frequency-agile transponder and at the same time is associated with a chirped radar system incorporating a chirped transmitter 71. The transmitter 71 is coupled to the antenna 70 through a circulator 72 which in turn is associated with an RF amplifier 73. The output of the RF amplifier is split, with one output going to a mixer 74 and the other output to mixer 75.

Mixer 74 receives another input from local oscillator 76 and the output of mixer 74 is coupled through an IF amplifier 77 as an input to a dispersive delay line 78 which in turn is coupled to a video detector 79. Mixer 75, in turn, receives another input from a local oscillator 80 and the output of the mixer is coupled through an IF amplifier 81 as an input to another dispersive delay line 82, the output of which is coupled to another video detector 83.

In the circuit of FIG. 7, two local oscillators are employed i.e., 76 and 80, with one tuned above the transmitter center frequency and the other below it. After initial amplification in RF amplifier 73, signals received on the antenna 70 are directed into two parallel channels, the one fed by a heterodyning mixer 74 coupled to local oscillator 76 and the other by a heterodyning mixer 75 coupled to local oscillator 80.

Figure 8:
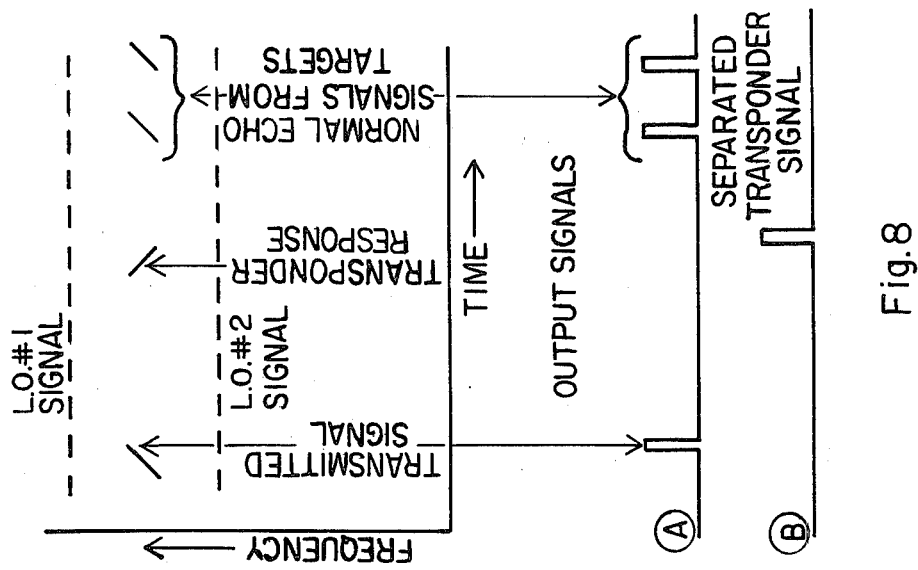
FIG. 8 is an illustration of waveforms at various points in FIG. 7.

As is illustrated by the waveforms shown in FIG. 8, the frequency sweep of the normal echo intermediate frequency (IF) signals that result in the channel associated with local oscillator 76 are in the proper direction for compression and detection, while the sweep of the transponder IF signal received in the channel associated with local oscillator 80 is not. Conversely, the direction of the frequency sweep of the transponder IF signal in the channel associated with local oscillator 80 is proper for compression and detection while that of the normal echo IF signals is not. Thus, both forward and reversely swept signals are detected, but in separate channels. This automatic separation of the transponder signals from normal echo signals is generally desirable. However, if it is not, the two channels may be recombined after a state or two of IF amplification and the requirement for duplicate dispersive delay lines, etc. can be obviated.

In the embodiments of the present invention, the basic form of the transponder provides operation with a frequency-agile radar without requiring use of a microwave delay line, which for typical radar pulse widths is a bulky item. Also, when used with a suitably equiped chirped radar the subject transponder provides a reversely swept signal that can readily be distinguished from normal echo signals, a feature that is of considerable value in trying to distinguish a transponder from other ground objects or a friendly missile from targets and clutter. The form of the invention with the encoded data response of FIG. 3 provides a means of conveying coded information along with the direct transponder response, a feature not known to have previously been provided with frequency-agile transponders because of the complexity, quantities of bulky delay lines and high speed microwave switching circuits incident to such an approach. The embodiment of the invention as set forth in FIG. 5, with counterdirectional response, provides the advantage of signal directivity in long range operations without requiring that the antenna array be mechanically oriented toward the interrogating radar.

What is claimed is:
1. A transponder comprising;
input means adapted to receive a microwave pulse;
said input means comprising a first antenna;
repeater means adapted to repeat backwards after a short and controllable delay a microwave pulse fed to it coupled to said input means;
triggering means coupled to said repeater means for causing said repeater means to output backwards a microwave pulse fed to it;
another antenna for receiving microwave pulses therefrom;
detector means coupled to said another antenna and having an output;
variable delay means operatively coupled to the output of such detector means and having an output therefrom;
said variable delay means output being coupled as an input to said triggering means;
isolation means operatively coupled between said first antenna and said repeater means; and
a microwave delay line operatively coupled to said isolation means so that outputs from the microwave delay line are periodically coupled back as an additional input to the repeater means so that a predetermined series of response pulses are emitted from said antenna.

2. A transponder as set forth in claim 1 wherein; said repeater means comprises an amplified ferromagnetic echo device.

3. A transponder as set forth in claim 1 and further including;
commutator means operatively coupled as another input to the delay means and operatively receiving an output from said triggering means; and
said commutator means having additional inputs thereto which correspond to predetermined delay increments so that said delay means may be adjusted under control of the commutator means to provide variable delays to said triggering means.

4. A transponder comprising;
input means adapted to receive a microwave pulse;
said input means comprising multiple antennas;
repeater means adapted to repeat backwards after a short and controllable delay a microwave pulse fed to it coupled to said input means;
said repeater means comprising multiple repeaters, one of each associated with an individual antenna such that the output of said repeater means is coupled to said antennas to provide a counter directional response to an incoming signal received at said antennas; and
triggering means coupled to said repeater means for causing said repeater means to output backwards a microwave pulse fed to it.

5. A transponder as set forth in claim 4 wherein the output electrical lead length from the triggering means to each of said repeater means is exactly electrically equal.

6. A circuit for separating frequency-agile transponder signals from normal echo signals in a chirped radar comprising;
antenna means adapted to receive frequency-agile signals and chirped radar signals thereon;
mixer means operatively connected to said input means for receiving a microwave pulse;
local oscillator means having an output operatively coupled as an input to the mixer;
a delay line operatively connected to the output of said mixer means and having an output therefrom;
video detector means operatively coupled to the output of said delay line for producing an output signal;
other mixer means operatively receiving an input from said input means and having an output coupled therefrom;
another oscillator means having an output coupled as an input to said mixer means;
another delay line operatively receiving the output from said mixer means to introduce a suitable delay in the received signal thereto; and
another video detector means operatively coupled to the output of said another delay line for producing another signal such that the output of the corresponding video detector means comprise normal echo signals and transponder signals therefrom.

* * * * *